(12) United States Patent
Gudipati et al.

(10) Patent No.: US 12,730,923 B1
(45) Date of Patent: Sep. 8, 2026

(54) ON-DEMAND ENCRYPTION FOR ONLINE DATABASE ENCRYPTION TRANSITIONS

(71) Applicant: Amazon Technologies, Inc., Seattle, WA (US)

(72) Inventors: Krishna Chaitanya Gudipati, Fremont, CA (US); Gokul Soundararajan, San Jose, CA (US); Sanjay Wangoo, San Ramon, CA (US); Yao Xiao, Sunnyvale, CA (US); Ippokratis Pandis, Menlo Park, CA (US); Fabian Oliver Nagel, Mountain View, CA (US); Yehan Zhang, Sunnyvale, CA (US); Ankil Shah, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 253 days.

(21) Appl. No.: 17/810,328

(22) Filed: Jun. 30, 2022

(51) Int. Cl.
*G06F 21/62* (2013.01)
*G06F 21/60* (2013.01)

(52) U.S. Cl.
CPC ........ *G06F 21/6227* (2013.01); *G06F 21/602* (2013.01)

(58) Field of Classification Search
None
See application file for complete search history.

(56) References Cited

U.S. PATENT DOCUMENTS 7,743,069 B2 6/2010 Chitkara et al.
8,812,877 B2 8/2014 Mori et al.
10,719,567 B2 7/2020 Antonopoulos et al.
11,588,633 B1 * 2/2023 Sapuntzakis .......... G06F 3/0673
11,822,686 B2 * 11/2023 Robinson-Morgan ....................... G06F 21/6209
2016/0292427 A1 * 10/2016 Paya ..................... H04L 63/061
2018/0096164 A1 * 4/2018 Dageville ............. G06F 21/602
2018/0137208 A1 * 5/2018 Ricker ..................... H04L 9/065
2019/0026476 A1 * 1/2019 Van Riel ............. G06F 21/6218
2019/0050266 A1 * 2/2019 Gupta ................. G06F 11/3404
2019/0147170 A1 * 5/2019 Keselman ............. G06F 21/602 713/189
2019/0171843 A1 * 6/2019 Sun ..................... G06F 21/6245
2019/0384845 A1 * 12/2019 Saxena ............. G06F 16/24545
2021/0357521 A1 * 11/2021 Trepetin .............. G06F 21/6254

* cited by examiner

*Primary Examiner* — Younes Naji
(74) *Attorney, Agent, or Firm* — S. Scott Foster; Kowert, Hood, Munyon, Rankin & Goetzel, P.C.

(57) ABSTRACT

On-demand encryption may be implemented for online database encryption transition. Determinations can be made for individual data blocks as to whether individual data blocks have been encrypted using a new encryption scheme. Therefore read requests, write requests, or background operations can access and encrypt, if not already performed, different data blocks for the database while the database is in transition to the new encryption scheme.

19 Claims, 8 Drawing Sheets

ON-DEMAND ENCRYPTION FOR ONLINE DATABASE ENCRYPTION TRANSITIONS

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amounts of data that organizations must store and manage often correspondingly increases both the size and complexity of data storage and management technologies, like database systems, which in turn escalate the cost of maintaining the information. New technologies more and more seek to reduce both the complexity and storage requirements of maintaining data while simultaneously improving the efficiency of data processing.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques for on-demand encryption for online database encryption transitions are described herein. Different security use cases may implicate changes to the way database data is stored. For example, different protocols, regulations, or other external factors may make it desirable to add or modify encryption to database data at rest (e.g., as it is stored in storage devices). Database encryption changes, however, can prove time consuming and, in some cases, make the database data unavailable for unacceptable periods of time. Techniques for on-demand encryption for online database encryption transitions, however, can support adding or modifying encryption for databases in many different scenarios while maintaining access to the database, and thus keeping the database online to perform various other operations.

Figure 1:
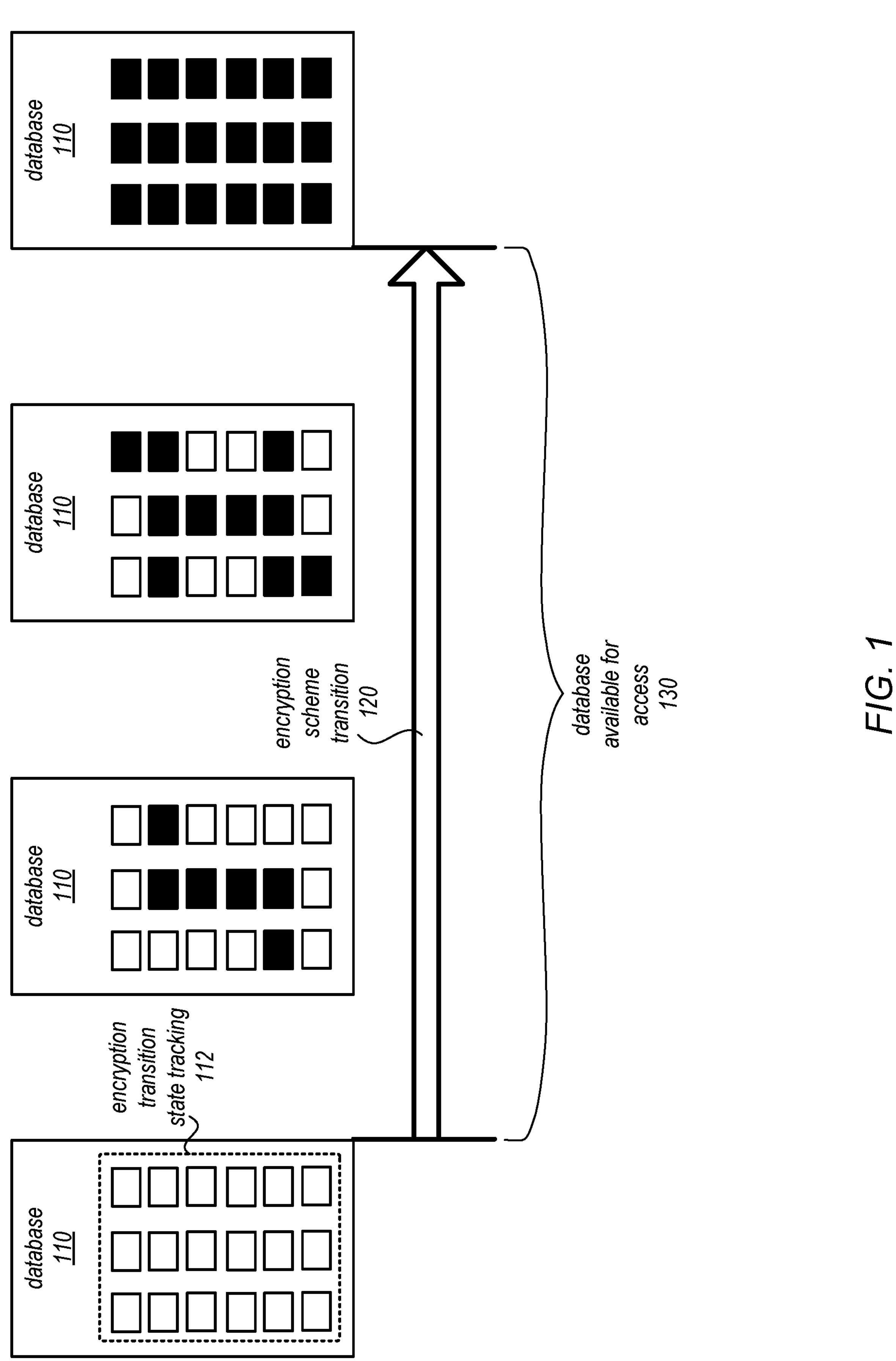
FIG. 1 is a logical block diagram illustrating on-demand encryption for online database encryption transitions, according to some embodiments

FIG. 1 is a logical block diagram illustrating on-demand encryption for online database encryption transitions, according to some embodiments. Database 110 may be a database stored or managed by a database system, in various embodiments. Database 110 may, for example, be managed by a standalone database system (e.g., on a private set of one or more computing systems), or may be managed as part of a database service, which may be implemented as part of a public provider network like database service 210 discussed in detail below with regard to FIG. 2. Database data 110 may be stored on behalf of one or more clients of the database system and be accessible to clients via various interfaces, protocols, or other techniques.

Various workflows, tasks, operations, or scenarios may be supported by a database system for database 110 that may allow for a change to add or modify an encryption scheme. For example, a restore operation may be performed using a snapshot or other backup copy of database 110 that was not originally encrypted to restore database 110 into a new set of resources encrypted according to a new encryption scheme. In another example, in-place encryption may be performed so that while no database data is moved, it may be changed to the new encryption scheme.

In various embodiments, encryption may refer to various techniques to encode data as it is stored (at rest) in storage devices for database 110. Such techniques may include the use of one or multiple encryption keys which may be used to encode the data through the application of various functions utilizing the encryption key so as to render the actual contents encrypted data inaccessible without applying the correct decryption technique to make the contents understandable (e.g., by applying the correct one or more encryption keys).

Once a new encryption scheme (e.g., a new key, new application of a key in place of an existing key or to be applied to a specific table or column) is determined, then online encryption transition techniques may be performed.

As discussed in detail below with regard to FIGS. 4-7, different encryption techniques may be applied so as not to interfere with the performance of access requests, such as performing on-demand encryption on reads or writes to database 110 or as a background process that identifies and uses optimal time periods to apply encryption.

As depicted in FIG. 1, encryption scheme transition 120 may be performed over time. However, while performed, database 110 may still be available. FIG. 1 depicts encryption state transition tracking 112 for database 110, where filled blocks represent data blocks being encrypted according to the new encryption scheme over time. These encryption changes, as result of access requests or background operations may allow for the transition to be performed over time while eventually making database 110 fully transitioned.

Please note that the previous description of databases and encryption scheme transitions are logical descriptions and thus are not to be construed as limiting as to the implementation of these features.

This specification continues with a general description of a provider network that implements database services (or other data storage or processing services) that may implement using computer resources to use encrypted data or transition to or between encryption schemes. Then various examples of one such database service, including different components/modules, or arrangements of components/module that may be employed as part of implementing the techniques for on-demand encryption for online database encryption transitions are discussed. A number of different methods and techniques to implement on-demand encryption for online database encryption transitions, some of which are illustrated in accompanying flowcharts, are then discussed. Finally, a description of an example computing system upon which the various components, modules, systems, devices, and/or nodes may be implemented is provided. Various examples are provided throughout the specification.

Figure 2:
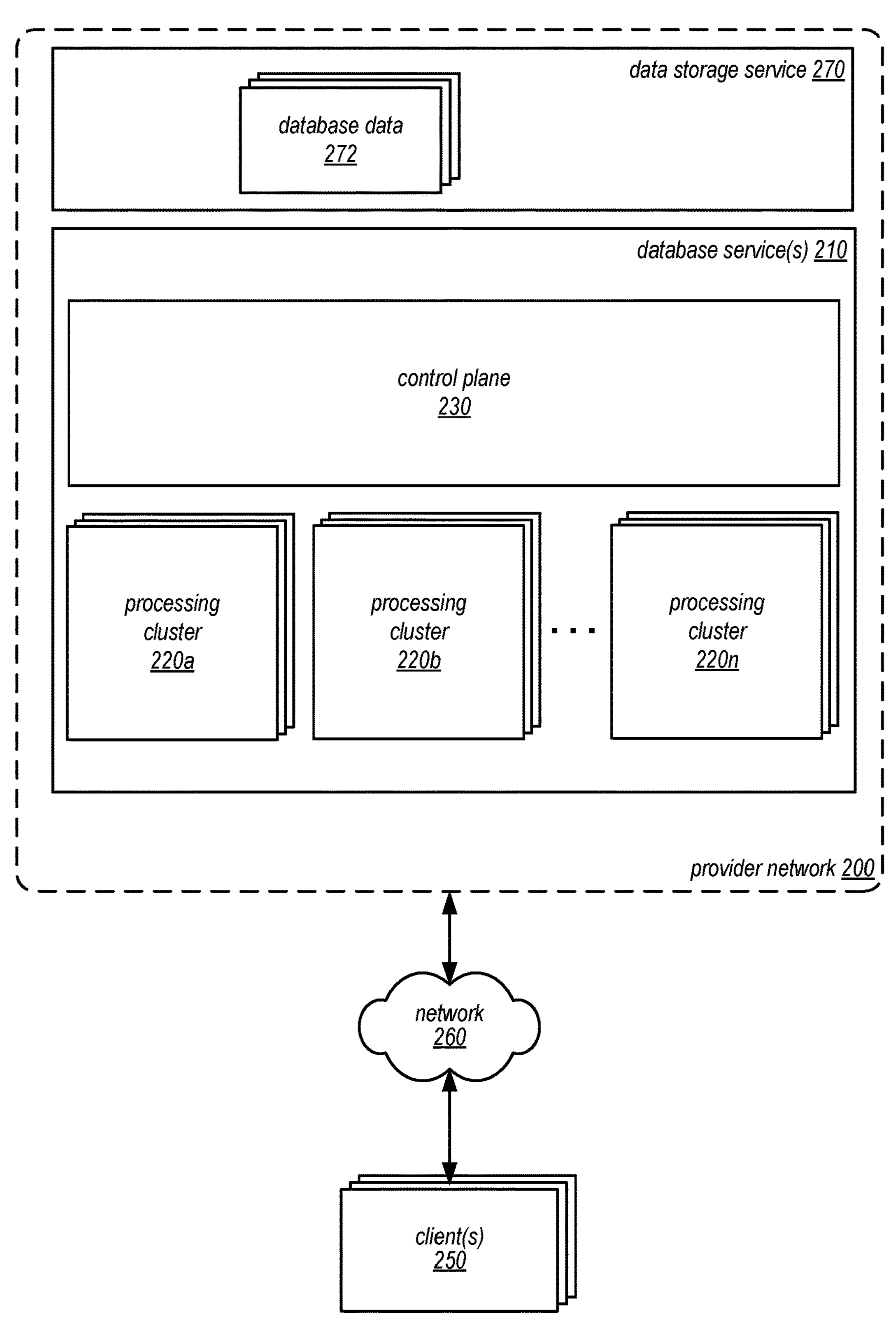
FIG. 2 is a logical block diagram illustrating a provider network offering a database service that utilizes on-demand encryption for online database encryption transitions, according to some embodiments.

FIG. 2 is a logical block diagram illustrating a provider network offering a database service that utilizes on-demand encryption for online database encryption transitions, according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 8), needed to implement and distribute the infrastructure and services offered by the provider network 200, in one embodiment. In some embodiments, provider network 200 may implement various computing resources or services, such as database service(s) 210 or other data processing services, (e.g., a map reduce service, a data warehouse service, and other large scale data processing services) and/or any other type of network based services (which may include a virtual compute service and various other types of storage, processing, analysis, communication, event handling, visualization, data cataloging, data ingestion (e.g., ETL), and security services not illustrated), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 8 and described below, in one embodiment. In various embodiments, the functionality of a given system or service component (e.g., a component of database service(s) 210 may be implemented by a particular node or may be distributed across several nodes. In some embodiments, a given node may implement the functionality of more than one service system component (e.g., more than one data store component).

Database services 210 may be various types of data processing services that perform general or specialized data processing functions (e.g., analytics, big data querying, or any other type of data processing operation) over data that is stored across multiple storage locations, in some embodiments. For example, in at least some embodiments, database services 210 may include various types of database services (e.g., relational) for storing, querying, and updating data. Such services may be enterprise-class database systems that are scalable and extensible. Queries may be directed to a database in database service(s) 210 that is distributed across multiple physical resources, as discussed below, and the database system may be scaled up or down on an as needed basis, in some embodiments. The database system may work effectively with database schemas of various types and/or organizations, in different embodiments. In some embodiments, clients/subscribers may submit queries or other requests (e.g., requests to add data) in a number of ways, e.g., interactively via an SQL interface to the database system or via Application Programming Interfaces (APIs). In other embodiments, external applications and programs may submit queries using Open Database Connectivity (ODBC) and/or Java Database Connectivity (JDBC) driver interfaces to the database system.

In some embodiments, database service(s) 210 may include services that process requests to data that is not stored in fully structured storage (e.g., non-relational or NoSQL databases). Database services 210 may access the data that is semi-structured or not-structured in storage, such as data objects of unstructured or semi-structured data in a separate data storage service, in one embodiment. In other embodiments, database services 210 may locally store, managed, and access semi-structured or not-structured data (e.g., an object-based and/or key-value data store that stores tables joined with tables in other services, such as database service(s) 210 or the same storage service).

Generally speaking, clients 250 may encompass any type of client that can submit network-based requests to provider network 200 via network 260, including requests for database service(s) (e.g., a request or other query to a database in database services 210, etc.). For example, a given client 250 may include a suitable version of a web browser, or may include a plug-in module or other type of code module that can execute as an extension to or within an execution environment provided by a web browser. Alternatively, a client 250 may encompass an application, such as a database application (or user interface thereof), a media application, an office application or any other application that may make use of database services 210 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture. In some embodiments, clients of database service(s) 210 may be internal to or implemented as part of provider network 200 (e.g., on another provider network service not illustrated).

In some embodiments, a client 250 may provide access to provider network 200 to other applications in a manner that is transparent to those applications. For example, client 250 may integrate with an operating system or file system to provide storage on one of database service(s) 210 (e.g., a database table that stores data on behalf of the operating system or file system). However, the operating system or file system may present a different storage interface to applications, such as a conventional file system hierarchy of files, directories and/or folders. In such an embodiment, applications may not need to be modified to make use of the storage system service model. Instead, the details of interfacing to database service(s) 210 may be coordinated by client 250 and the operating system or file system on behalf of applications executing within the operating system environment. Similarly, a client 250 may be an analytics application that relies upon database services to execute various queries for data already ingested or stored in the database service 210 or data stored in a data lake hosted in other storage service(s) in provider network 200 that may be accessible to a query engine implemented as part of database service(s) 210).

Clients 250 may convey network-based services requests (e.g., access requests to read or write data) via network 260, in one embodiment. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

In at least some embodiments, a database service 210 may be a data warehouse service or other database that stores data across multiple storage locations (e.g., across different nodes in a processing cluster). In such scenarios a data warehouse service, may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data, in one embodiment. A client's use for the data may also affect the configuration of the data management system used to store the data. For instance, for certain types of data analysis and other operations, such as those that aggregate large sets of data from small numbers of columns within each row, a columnar database table may provide more efficient performance, in one embodiment. In other words, column information from database tables may be stored into data blocks on disk, rather than storing entire rows of columns in each data block (as in traditional database schemes). The following discussion describes various embodiments of a column-oriented (sometimes referred to as "columnar") database service (e.g., such as data warehouse service). However, various versions of the components discussed below as may be equally adapted to implement embodiments for various other types of systems, such as row-oriented database systems. Therefore, the following examples are not intended to be limiting as to various other types or formats of structured data that may be stored, accessed, or otherwise managed by database service 210.

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data).

Database service 210 may be implemented by a large collection of computing devices, such as customized or off-the-shelf computing systems, servers, or any other combination of computing systems or devices, such as the various types of systems 1000 described below with regard to FIG. 8, in some embodiments. Different subsets of these computing devices may be controlled by control plane 230. Control plane 230, for example, may provide an interface to clients or users who wish to interact with the processing clusters 220 managed by control plane 230. For example, the interface may implement one or more Application Programming Interfaces (APIs) to allow client systems to programmatically invoke database service operations, functions, or other features and/or the interface may implement or provide one or more graphical user interfaces (GUIs) for storage clients (e.g., as a web-console). The interface may allow clients to select various control functions offered by database service 210 for the processing clusters 220 hosted in the database service 210, in some embodiments. For example, a user may make adjustments to workload allocations, prioritization schemes, cluster size, network mappings or other operations or tasks for performing a query.

In at least some embodiments, control plane 230 may implement cluster performance monitoring, which may track, store, organize and/or evaluate performance metrics collected for queries performed at processing clusters 220. For example, performance monitoring may receive reported metrics from a leader node, and store them in a common storage location (e.g., in a file, direct, or object within a storage service) for the database (or user account associated with the database). In some embodiments, performance monitoring may evaluate processing cluster performance in order to trigger the performance of various control plane 230 operations (e.g., node replacement or failover operations). In some embodiments, cluster scaling may be implemented as part of control plane 230 to respond to user requests to add or remove node from a processing cluster or automatically triggered requests/events to add or remove nodes (e.g., based on utilization thresholds for processing, storage, network, or other cluster resource).

Various clients (or customers, organizations, entities, or users) may wish to store and manage data using database service 210, in some embodiments. Processing clusters, such as processing clusters 220*a*, 220*b*, and 220*n* may respond to various requests, including write/update/store/redistribute requests (e.g., to add data into storage) or other queries for data (e.g., such as a Server Query Language request (SQL) for particular data), as discussed below with regard to FIG. 3, along with many other data management or storage services, in some embodiments. Queries may be directed to data that is locally hosted as part of database service 210 or stored elsewhere that is fully structured data or queries directed to data that is not-structured, such as log records, event data, or machine generated data stored in another storage service, in some embodiments.

Multiple users or clients may access a processing cluster 220 to obtain data warehouse services, in one embodiment. In at least some embodiments, a database service 210 may provide network endpoints to the clusters which allow the clients to send requests and other messages directly to a particular cluster. Network endpoints, for example, may be a particular network address, such as a URL, which points to a particular cluster, in one embodiment. For instance, a client may be given the network endpoint "http://mycluster.com" to send various request messages to. Multiple clients (or users of a particular client) may be given a network endpoint for a particular cluster, in one embodiment. Various security features may be implemented to prevent unauthorized users from accessing the clusters, in some embodiments. Conversely, a client may be given network endpoints for multiple clusters, in one embodiment.

Processing clusters 220 may provide an enterprise-class database query and management system that allows users to send data processing requests to be executed by the clusters 220, such as by sending a data processing request to a cluster control interface implemented by the processing clusters, in some embodiments. Processing clusters 220 may perform data processing operations with respect to data stored locally in a processing cluster. Requests sent to a processing cluster 220 may be directed to local data stored in the processing cluster, in some embodiments. Therefore, processing clusters may implement local data processing to plan and execute the performance of requests or other queries with respect to local data in the processing cluster in one embodiment. In some embodiments, the processing clusters may access or send processing instructions to data that is stored remote from and/or external to the processing clusters, such as data stored in another service.

Processing clusters 220 may allow users of database service 210 to perform data warehouse functions, such as fast querying capabilities over structured data, integration with various data loading and ETL (extract, transform, and load) tools, client connections with best-in-class business intelligence (BI) reporting, data mining, and analytics tools, and optimizations for very fast execution of complex analytic queries such as those including multi-table joins, sub-queries, and aggregation, more efficiently, in various embodiments. In other embodiments, database service 210 and/or processing clusters 220 may offer query capabilities may query over other types of data (e.g., semi-structured data, unstructured data, various other kinds of data, such as media, or no-schema data).

Figure 3:
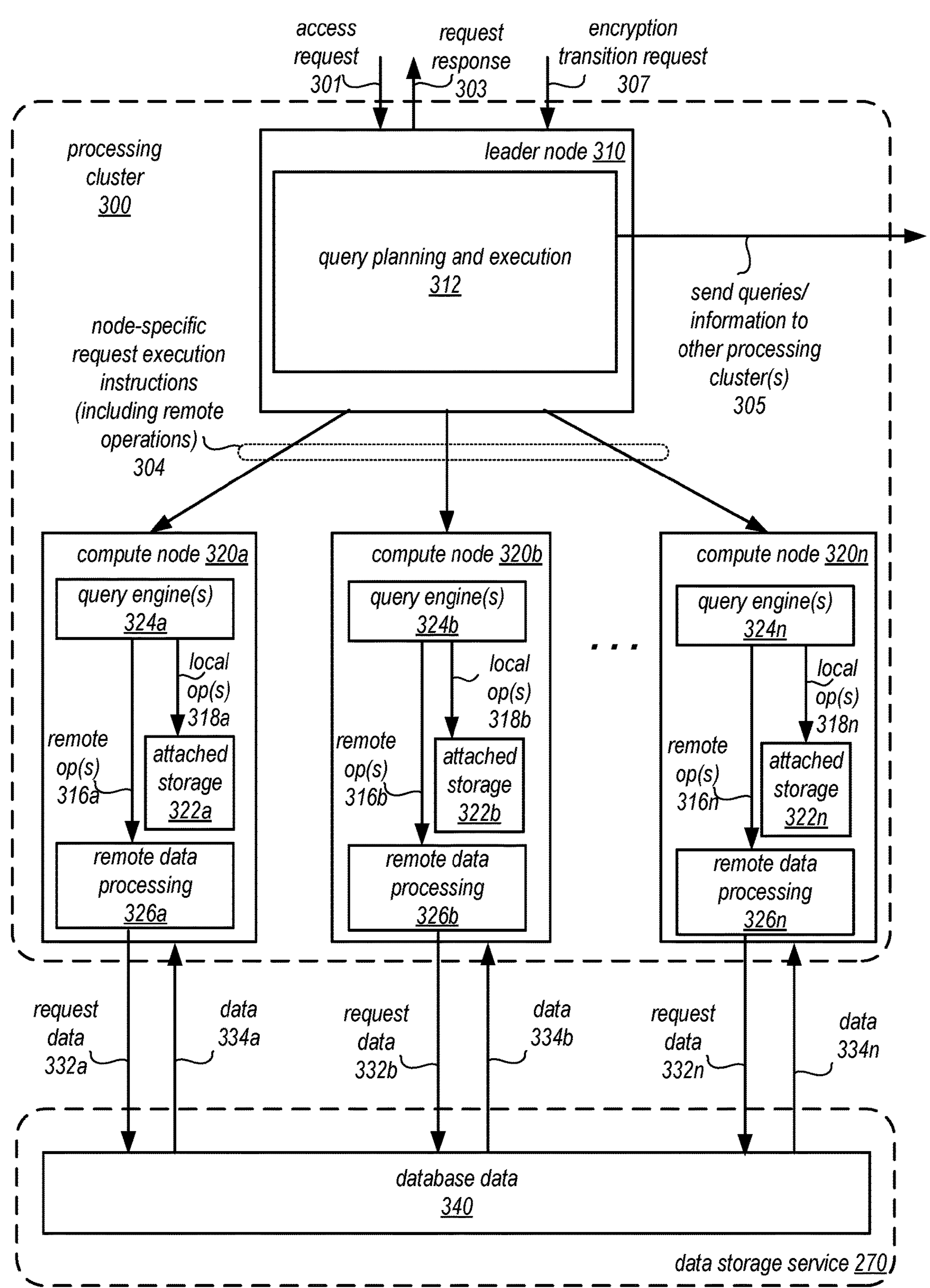
FIG. 3 is a logical block diagram illustrating a processing cluster of a database service, according to some embodiments.

FIG. 3 is a logical block diagram illustrating a processing cluster of a database service that query planning and execution that also accounts for topologies, according to some embodiments. Processing cluster 300 may be data warehouse service cluster, like processing clusters 220 discussed above with regard to FIG. 2, or another processing cluster that distributes execution of a query among multiple processing nodes, in one embodiment. As illustrated in this example, a processing cluster 300 may include a leader node 310 and compute nodes 320*a*, 320*b*, and 320*n*, which may communicate with each other over a network or other interconnect (not illustrated), in one embodiment. Leader node 310 may implement request planning 312 to generate plan(s) and instructions 314 for executing various access requests 301, such as query, or requests to update, add, modify, or remove data, on processing cluster 300, in one embodiments, the performance of which may include various responses, as indicated at 303.

In some embodiments, various encryption transition requests 307 may be received at leader node 310 (or at control plane 230). These requests 307 may include requests to perform in-place transition from no-encryption scheme to an encryption scheme, from a current encryption scheme to a different encryption scheme, requests to add encryption or change encryption as part of various database modifications, including database restores, database resizes, or database concurrency scaling. Because encryption transition state is tracked, as discussed below with regard to FIGS. 4 and 5, encryption state transitions can be understood or completed across different clusters (e.g., completed at a new processing cluster that is the target of a resize or restore, or is providing additional performance capacity as concurrency scaling for a database). In some embodiments, leader nodes 310 may utilize for facilitate data sharing, including forwarding queries or data, such as metadata obtained from compute nodes including encryption transition state tracking to other processing clusters 305.

Leader node 310 may also implement metric planning history/performance metric collection (not illustrated) to collect and report performance metrics collected for various events, units of work, or other portions a query or other operation's performance, compute node or leader node performance, and history of operations performed, in some embodiments. As described herein, each node in a processing cluster 300 may include attached storage, such as storage device(s) 324*a*, 324*b*, and 324*n*, on which a database, including tables and materialized views (or portions thereof) may be stored on behalf of clients (e.g., users, client applications, and/or storage service subscribers), in one embodiment.

Note that in at least some embodiments, data processing capability may be separated from compute nodes, and thus in some embodiments, additional components may be implemented for processing requests. Additionally, it may be that in some embodiments, no one node in processing cluster 300 is a leader node as illustrated in FIG. 3, but rather different nodes of the nodes in processing cluster 300 may act as a leader node or otherwise direct processing of requests to data stored in processing cluster 300, in one embodiment. While nodes of processing cluster may be implemented on separate systems or devices, in at least some embodiments, some or all of processing cluster may be implemented as separate virtual nodes or instance on the same underlying hardware system (e.g., on a same server).

Leader node 310 may manage communications with clients, such as clients 250 discussed above with regard to FIG. 2, in one embodiment. For example, leader node 310 may be a server that receives an access request (e.g., a query for data or a request to add data) 302 from various client programs (e.g., applications) and/or subscribers (users), then parses them and develops an execution plan (e.g., query plan(s)) to carry out the associated database operation(s).

Leader node 310 may develop the series of steps necessary to obtain results for query 302, in one embodiment. Query 302 may be a query directed to a database table that is stored within processing cluster 300 (e.g., at one or more of compute nodes 320), in one embodiment. Leader node 310 may also manage the communications among compute nodes 320 instructed to carry out database operations for data stored in the processing cluster 300, in one embodiment. For example, node-specific request instructions 314 may be generated or compiled code that is distributed by leader node 310 to various ones of the compute nodes 320 to carry out the steps needed to perform a query or other operation in request 302, including executing the code to generate intermediate results of request 302 at individual compute nodes that may be sent back to the leader node 310, in one embodiment. Leader node 310 may receive data and responses or results (e.g., data 344*a*, 344*b*, and 344*c*) from compute nodes 320 in order to determine a final result for a request, in one embodiment. A database schema, data format and/or other metadata information for the data stored among the compute nodes, such as the data tables stored in the cluster, may be managed and stored by leader node 310 or obtained from a separate store (e.g., a data catalog service), in some embodiments. Request planning 312 may include the generation and selection of a plan to perform requests 302, in some embodiments.

Processing cluster 300 may also include compute nodes, such as compute nodes 320*a*, 320*b*, and 320*n*. Compute nodes 320, may for example, be implemented on servers or other computing devices, such as those described below with regard to computer system 1000 in FIG. 8, and each may include individual query processing "slices" defined, for example, for each core of a server's multi-core processor, one or more data processing engine(s), such as data processing 322*a*, 322*b*, and 322*n*, to execute the instructions 314 or otherwise perform the portions of the request plan assigned to the compute node, in one embodiment. Data processing 322 may access a certain memory and disk space in order to process a portion of the workload for a request that is sent to one or more of the compute nodes 320. Data processing 322 may access attached storage, such as 322*a*, 322*b*, and 322*n*, to perform operation(s), in one embodiment. For example, data processing 322 may scan data in attached storage 324, access indexes, perform joins, semi joins, aggregations, or any other processing operation assigned to the compute node 320, in one embodiment. Compute nodes 320 may send intermediate or final results from requests back to leader node 310 for final result generation (e.g., combining, aggregating, modifying, joining, etc.). Data, such as a database table, may be partitioned or otherwise distributed across the storage device(s) 324 as different partitions or shards of the data, in some embodiments. Compute nodes 320 may receive instructions specific to the shard(s) or partition(s) of the data to which the compute node 320 has access. Compute nodes 320 may implement metrics collection agents (not illustrated) in order to obtain the various performance metrics that may be collected for performing performance analysis for query planning, optimization, and execution of subsequent database queries.

Storage device(s), such as storage devices 324*a*, 324*b*, and 324*n*, may be implemented as one or more of any type of storage devices and/or storage system suitable for storing data accessible to the compute nodes, including, but not limited to: redundant array of inexpensive disks (RAID) devices, disk drives (e.g., hard disk drives or solid state drives) or arrays of disk drives such as Just a Bunch Of Disks (JBOD), (used to refer to disks that are not configured according to RAID), optical storage devices, tape drives, RAM disks, Storage Area Network (SAN), Network Access Storage (NAS), or combinations thereof. In various embodiments, disks may be formatted to store database tables (e.g., in column oriented data formats or other data formats).

Figure 4:
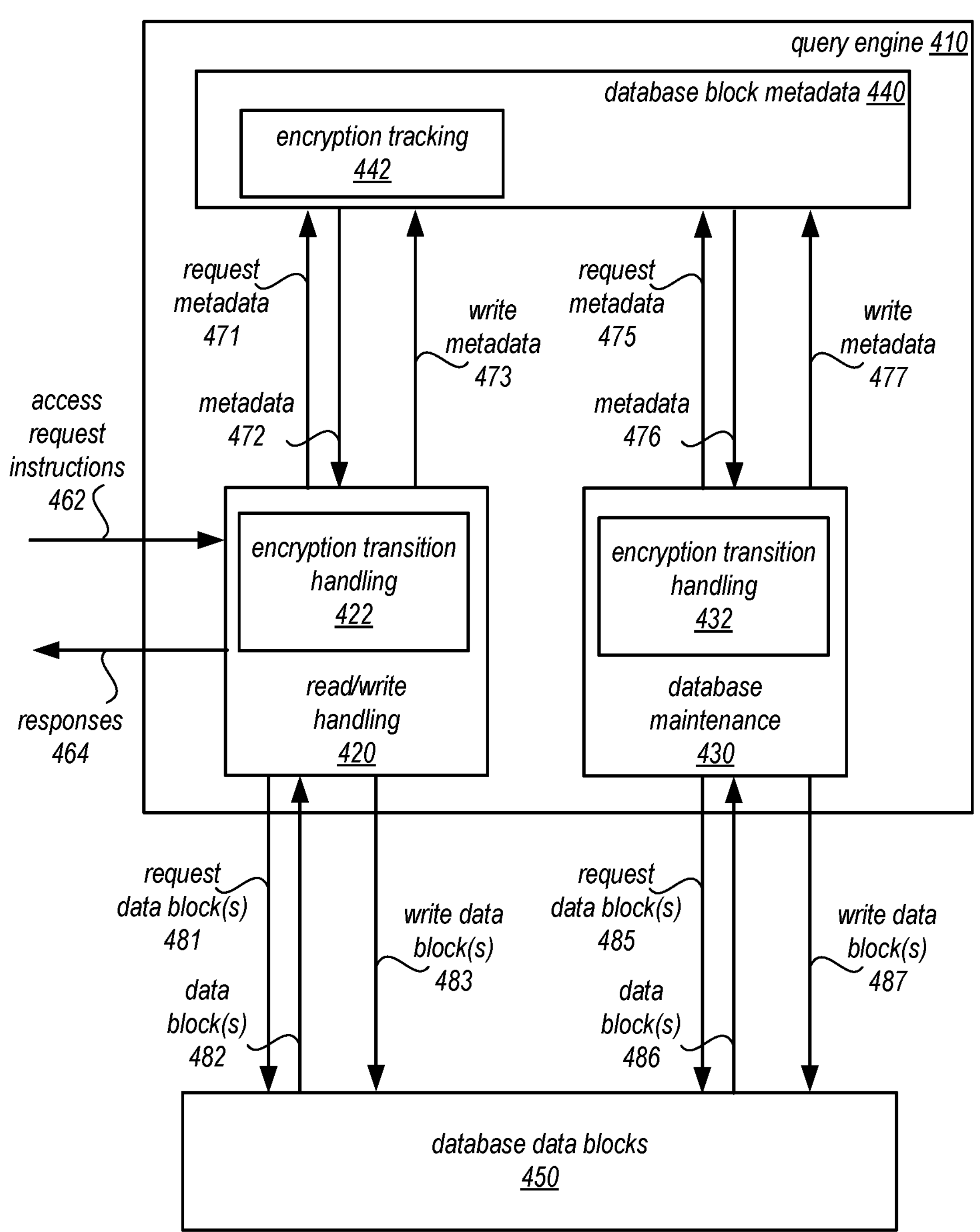
FIG. 4 is a logical block diagram illustrating a query engine that implements on-demand encryption for online database encryption transitions, according to some embodiments.

FIG. 4 is a logical block diagram illustrating a query engine that implements on-demand encryption for online database encryption transitions, according to some embodiments. Query engines, like query engine 410, may be implemented as part of compute nodes, as discussed above with regard to FIG. 3. In some embodiments, query engine 410 may be implemented in a non-distributed database (e.g., single node database) or in a database where no one node is a "leader node."

Query engine 410 may implement read/write handling 420. Read/write handling 420 may handle the various instructions to perform access requests discussed above with regard to FIG. 3. In some embodiments, read/write handling may implement encryption transition handling 422. In this way, for a database that is being transitioned to a new encryptions scheme (e.g., for a column, table, or the entire database), encryption handling 422 may determine whether the handling of reads or writes should change. For example, encryption transition handling 422 may determine, from database block metadata 440 (sometimes referred to as a superblock), whether operations to transition to a new encryption scheme should be performed. A request for metadata 471 may be made and returned, as indicated at 472. This may include requests to obtain various information about data blocks to access for access request instructions 462, including encryption tracking information 442, which as discussed below regard to FIGS. 5 and 6, may be used to determine whether individual data blocks have been transitioned to the new encryption scheme. In this way, when read/write handling requests the data block(s), as indicated at 481, and they are returned, as indicated 482, the appropriate handling may be performed.

For instance, if data block(s) need to be transitioned, then after performing various operations and returning responses 464 (or concurrently or before), read/write handling 420 may encrypt the data block(s) according to the new encryption scheme, and write the data block(s) 483 back to database data blocks 450. Similarly, if the instructions 462 are to add new data, then the data blocks may be encrypted and written at 483. Read/write handling 420 may also write metadata, as indicated at 473 to, among other things, change the indications of data block encryption tracking 442 to indicate that the new encryption scheme has been applied. In this way, if another request that reads the data blocks is received and performed, no new encryption scheme may need be applied.

Query engine 410 may also be responsible for handling various background operations as part of database maintenance 430. Note that in other embodiments, these features may be implemented as a separate process or component from query engine 410. Database maintenance 430 may detect times, events, or other triggers for performing database operations (e.g., as part of various workflows, tasks or operations to support database restores, resizes, data sharing, concurrency scaling or other features that make use of performing database data operations in the background in order to prepare or change database data for the workflow, task, or operation). As discussed below with regard to FIG. 7, database maintenance may detect or determine optimal times for performing database maintenance or other operations, in order to, for example, minimize or prevent disruption to client workloads (e.g., queries, writes, inserts, updates, or other access requests). For instance, an encryption window for the database may be detected (e.g., by encryption transition handling 432).

A request for metadata 475 may be made and returned, as indicated at 476. This may include requests to obtain various information about data blocks to including encryption tracking information 442, which as discussed below regard to FIGS. 5 and 7, may be used to determine whether individual data blocks have been transitioned to the new encryption scheme. If not already transitioned to the new encryption scheme, then data blocks may be selected for encryption, requested 485 from database data blocks 450, returned, as indicated at 486, encrypted and written back, as indicated at 487. Updates to encryption tracking 442 may be made as writes to metadata, as indicated at 477.

Figure 5:
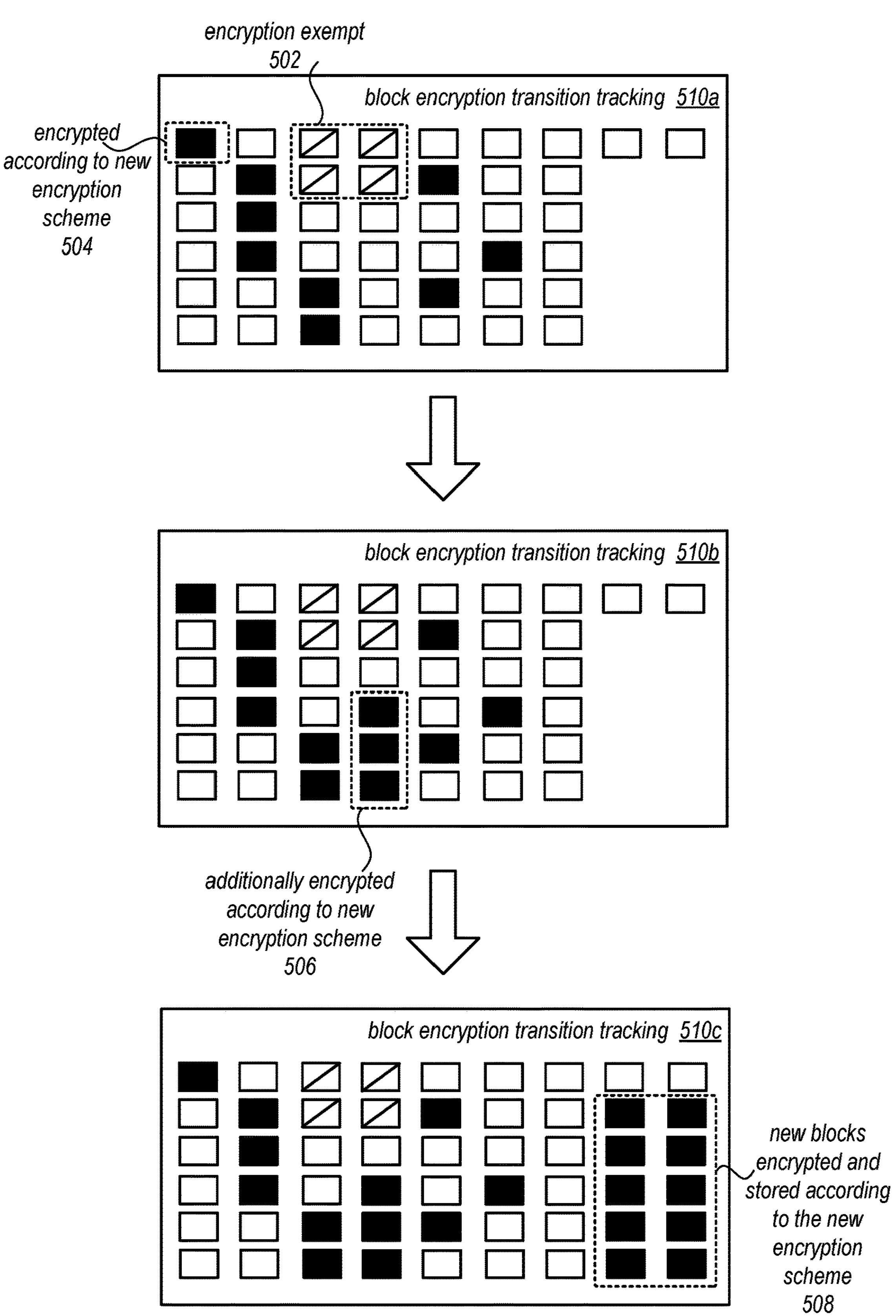
FIG. 5 is a series of logical block diagrams illustrating changes to block encryption transition tracking data, according to some embodiments.

FIG. 5 is a series of logical block diagrams illustrating changes to block encryption transition tracking data, according to some embodiments. Block encryption transition tracking 510 may be updated in the course of encrypting data blocks in various different scenarios, as discussed above, such as scenarios to change the encryption scheme for an entire database, one (or more tables) out of the tables of a database, or a column of a table (or a column in multiple tables) of the database. For example, block encryption transition tracking 510*a* illustrates different data blocks, where the solidly filled data blocks indicate data blocks that have already been encrypted, as exemplified at 504. To record this information, various data structures may be implemented, such as an index, table, or other information that, for instance, can map a block identifier with corresponding metadata (which may include further information in addition to block encryption transition state). In such an individual field, bit, cell, or other portion of the data structure for that data block may be set (e.g., have a value that indicates encryption has already been performed to the new encryption scheme). In some embodiments, some data blocks may store data (e.g., for internal, administrative, or non-user data) which is not to be encrypted (or may be encrypted differently). Therefore, information be stored that may indicate that these data blocks are exempted from the transition to the new encryption scheme, as depicted by the slashed line through the blocks at 502.

Because background or read/write access may change the makeup of the tracking data, examples of changes are illustrated at block encryption transition tracking 510*b* and 510*c*. For example, additionally encrypted data blocks may have been marked as encrypted, as indicated at 506, in some embodiments. In some scenarios, new data may be added to the database. In such scenarios, new data blocks may be written to storage. When writing these new blocks, they may be encrypted and stored according to the new encryption scheme. The corresponding tracking information in block encryption transition tracking 510*c* may be updated to reflect the new blocks as already being encrypted according to the new encryption scheme, as indicated at 508.

Although FIGS. 2-5 have been described and illustrated in the context of a database service, like a data warehouse service implementing a columnar relational database, the various components illustrated and described in FIGS. 2-5 may be easily applied to other database or data storage systems that implement or use encryption. As such, FIGS. 2-8 are not intended to be limiting as to other embodiments of a storage engine, query engine, a single or distributed database engine or management system, processing cluster, or other component that may implement using computer resources to implement on-demand encryption for online database encryption transitions.

Figure 6:
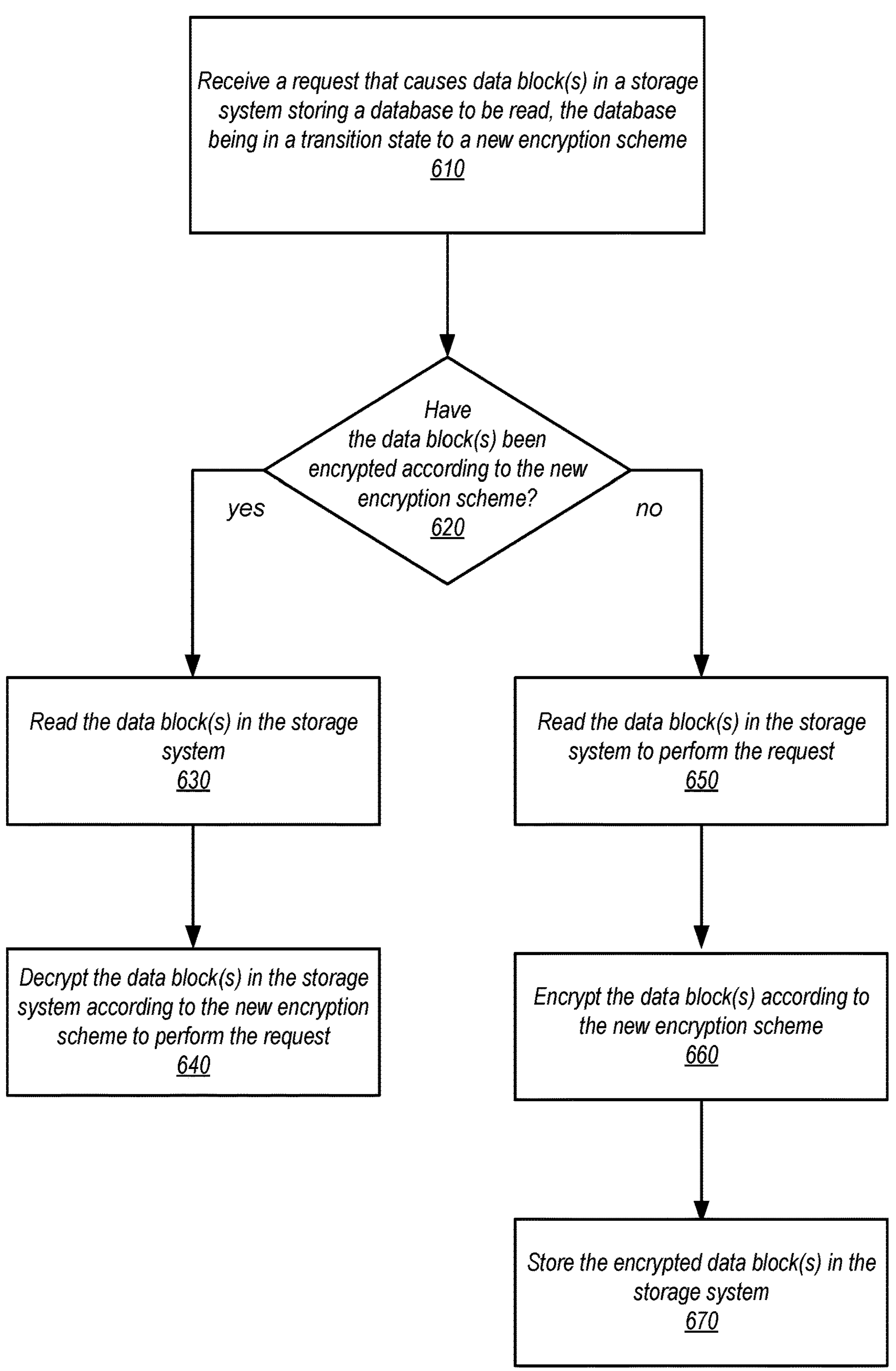
FIG. 6 is a high-level flowchart illustrating methods and techniques to implement read handling for on-demand encryption for online database encryption transitions, according to some embodiments.

FIG. 6 is a high-level flowchart illustrating methods and techniques to implement read handling for on-demand encryption for online database encryption transitions, according to some embodiments. Various different systems and devices may implement the various methods and techniques described below, including those discussed with regard to FIG. 7, either singly or working together. For example, a processing cluster, such as described above with regard to FIGS. 2-5 may implement the various methods. Alternatively, a combination of different systems and devices may implement the described techniques. Therefore, the above examples and or any other systems or devices referenced as performing the illustrated method, are not intended to be limiting as to other different components, modules, systems, or configurations of systems and devices.

As indicated at 610, a request may be received that causes data block(s) in a storage system storing database data to be read, according to some embodiments. The request may be received and specified in various formats. For example, in some embodiments, the request may be received as a query specified in a query language, such as Structured Query Language (SQL). In some embodiments, the request may be specified in the form of an API or other programmatic request (e.g., "Get Item X from Table Y"). In some embodiments, the request may first received at a request dispatcher, router, leader node, primary node, or various other initial request handling components. In some embodiments, the request may be receive directly at the database system (or component thereof) performing the request.

The database may be in a transition state to a new encryption scheme, in various embodiments. Different scenarios, operations, tasks, or workflows may cause the transition state to a new encryption scheme. For example, the database system may support requests to change from the current encryption scheme of a database (or no-encryption scheme where the database is not encrypted) to a new encryption scheme. The request may specify which one (e.g., of different types of key-structures or other encryption techniques supported by the database system) or how the new encryption scheme may be specified. In some embodiments, the encryption scheme transition may be performed as part of a database restoration (e.g., on a same or different set of computing resources, such as a different cluster/instance type), as part of a data sharing operation, where the data is being shared from another, source database system (e.g., by allowing a receiving database system to determine whether a new encryption scheme is being transitioned into at the source database system), as part of a resizing or other data movement operation for the database, or as part of scaling query capacity by allowing additional computing resources to accept and perform requests to access the database. In some embodiments, transition to a new encryption scheme may be specific to a portion of the database (e.g., to one or more tables of a database and/or one or more columns of a table).

In various embodiments, a data block may correspond to a unit of storage used to store one or more items of a database (e.g., from one or more rows of a single column or one or more records, containing multiple columns). For example, a data block can be a disk block or other block of a physical storage device corresponding to a consecutive range of bytes, for instance, that is accessible by the storage device in response to requests to access the data (e.g., read and write requests can be directed to individual data blocks).

As indicated at 620, a determination may be made as to whether the data block(s) have been encrypted according to the new encryption scheme, in some embodiments. For example, metadata information, as discussed above with regard to FIG. 5, may be maintained that tracks the individual encryption state of each data block. When a plan or other set of instructions to determine how to perform the request is generated, the data block(s) to read may be identified. Thus, the metadata information for these identified data blocks may be accessed (e.g., by identifier values, index values, etc.). Once accessed, determinations as to whether a data block needs to be encrypted may be made from the metadata information for the identified data blocks.

If the data blocks have been encrypted, then, as indicated at 630, the data block(s) may be read from the storage system, in some embodiments. As indicated at 640, the data block(s) may then be decrypted according to the new encryption scheme to perform the request, in some embodiments. For example, in some embodiments a multi-tier encryption scheme may be implemented. One database data encryption key may be used to encrypt data blocks. However, in order to access the data blocks, an individual block key, stored as part of the data block may also be used. This individual block key may be encrypted by the database data encryption key as part of encrypting the data block. An artifact of this encrypted individual block key (e.g., a hash value) may also be stored as part of the metadata for data blocks, in some embodiments.

If the data blocks have not been encrypted, then as indicated at 650, the data block(s) may be read from the storage system to perform the request, in some embodiments. In some scenarios, these data block(s) may not be encrypted. In some embodiments, these data block(s) may be encrypted according to a different encryption scheme, and therefore may be decrypted first using the different encryption scheme to perform the request.

As indicated at 660, the data block(s) may be encrypted according to the new encryption scheme, in some embodiments. As indicated at 670, the encrypted data block(s) may be stored in the storage system, in some embodiments. In some embodiments, the metadata for the data block(s) may be updated to indicate that the new encryption scheme has been applied. For example, a bit, flag, or other indicator may be updated to show that the new encryption scheme has been applied. In some embodiments, such as the multi-tier encryption scheme discussed above, a new database data encryption key for the new encryption scheme may be used to encrypt and obtain the individual data block keys and store them as part of the metadata, in some embodiments.

Figure 7:
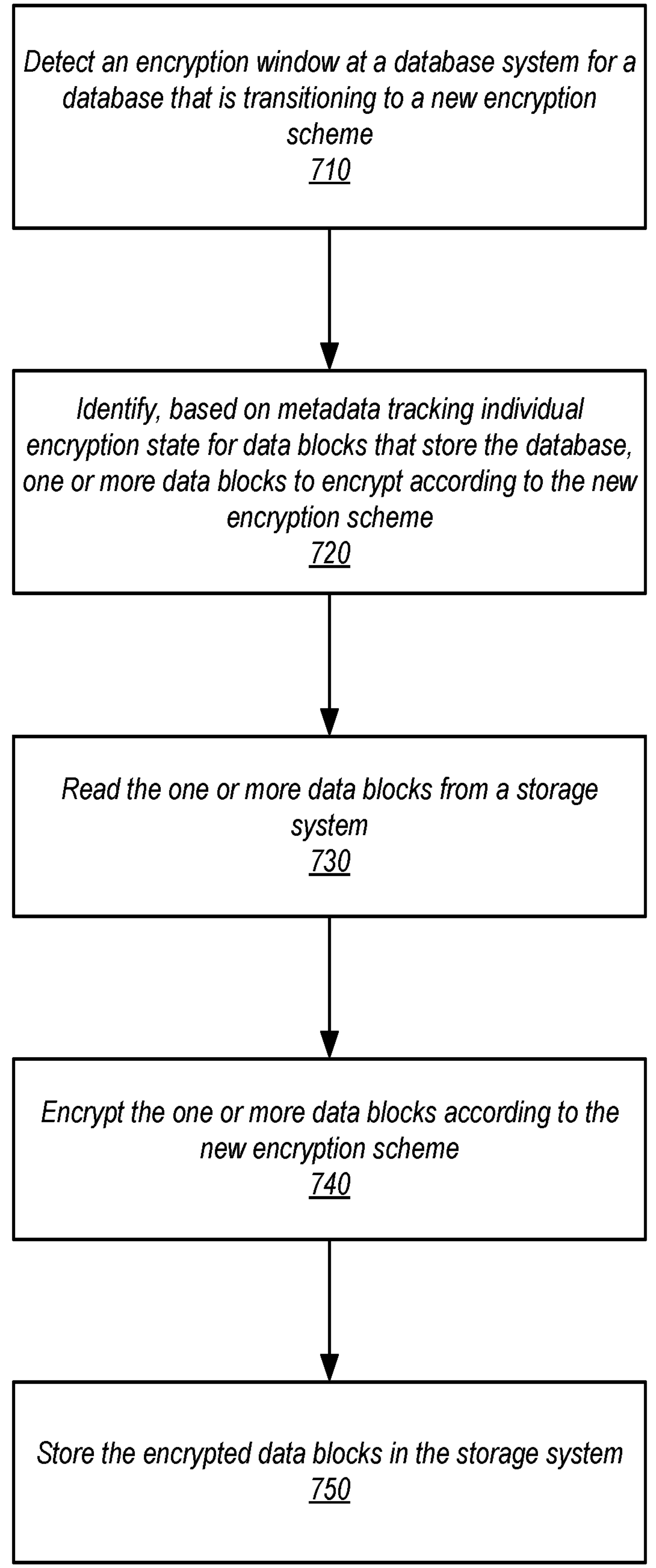
FIG. 7 is a high-level flowchart illustrating methods and techniques to implement an encryption window for on-demand encryption for online database encryption transitions, according to some embodiments.

In addition to perform encryption on-demand in response to various access requests, encryption transition may be performed on a block by block basis as part of a background process. In this way, opportune times to perform encryption may be identified, minimizing or eliminating disruptions on client workloads (e.g., database queries, inserts, updates, deletes, or other data modifications or addition operations). FIG. 7 is a high-level flowchart illustrating methods and techniques to implement an encryption window for on-demand encryption for online database encryption transitions, according to some embodiments.

As indicated at 710, an encryption window may be detected at a database system for a database that is transitioning to a new encryption scheme, in some embodiments. For example, an encryption window may include various criteria to detect or determine a time period where a number of encryption operations can be performed without interfering with client workloads at a database system. For example, the encryption window may be detected when various resource utilizations for the database system fall below a threshold amount for a period of time (e.g., processor utilization, network utilization, and/or I/O bandwidth utilization falls below 50% for a period of 5 minutes). Note that various other techniques may be determined. In some embodiments, workload prediction may be used to detect the encryption time window (e.g., based on historical workloads of the database system, various time series or prediction techniques may be utilized to identify periods of time as the encryption window in which database system utilization is low).

In some embodiments, an encryption window may be detected as part of performing other workflows tasks, or operations. For example, as discussed above, the encryption scheme transition may be performed as part of a database restoration (e.g., on a same or different set of computing resources, such as a different cluster/instance type), as part of a data sharing operation, where the data is being shared from another, source database system (e.g., by allowing a receiving database system to determine whether a new encryption scheme is being transitioned into at the source database system), as part of a resizing or other data movement operation for the database, or as part of scaling query capacity by allowing additional computing resources to accept and perform requests to access the database. In some embodiments, transition to a new encryption scheme may be specific to a portion of the database (e.g., to one or more tables of a database and/or one or more columns of a table).

As indicated at 720, one or more data blocks to encrypt according to the new encryption scheme based on metadata tracking individual encryption state for data blocks that store the database, as discussed above. For example, metadata information, as discussed above with regard to FIG. 5, may be maintained that tracks the individual encryption state of each data block. This metadata information be accessed to identify data blocks that have not been encrypted according to the new encryption scheme (e.g., by scanning the metadata to identify those data blocks that have not yet been encrypted according to the new encryption scheme). In some embodiments, different prioritization schemes for selecting data blocks to encrypt may be implemented. For instance, groups of consecutive data blocks may be selected for encryption to increase the speed of reading data blocks that are next to one another physical in a storage device.

As indicated at 730, the identified data block(s) may be read from the storage system, in some embodiments. In some scenarios, these data block(s) may not be encrypted. In some embodiments, these data block(s) may be encrypted according to a different encryption scheme, and therefore may be decrypted first using the different encryption scheme to perform the request.

As indicated at 740, the data block(s) may be encrypted according to the new encryption scheme, in some embodiments. As indicated at 750, the encrypted data block(s) may be stored in the storage system, in some embodiments. In some embodiments, the metadata for the data block(s) may be updated to indicate that the new encryption scheme has been applied. For example, a bit, flag, or other indicator may be updated to show that the new encryption scheme has been applied. In some embodiments, such as the multi-tier encryption scheme discussed above, a new database data encryption key for the new encryption scheme may be used to encrypt and obtain the individual data block keys and store them as part of the metadata, in some embodiments.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Embodiments of implement on-demand encryption for online database encryption transitions as described herein may be executed on one or more computer systems, which may interact with various other devices. One such computer system is illustrated by FIG. 8. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Figure 8:
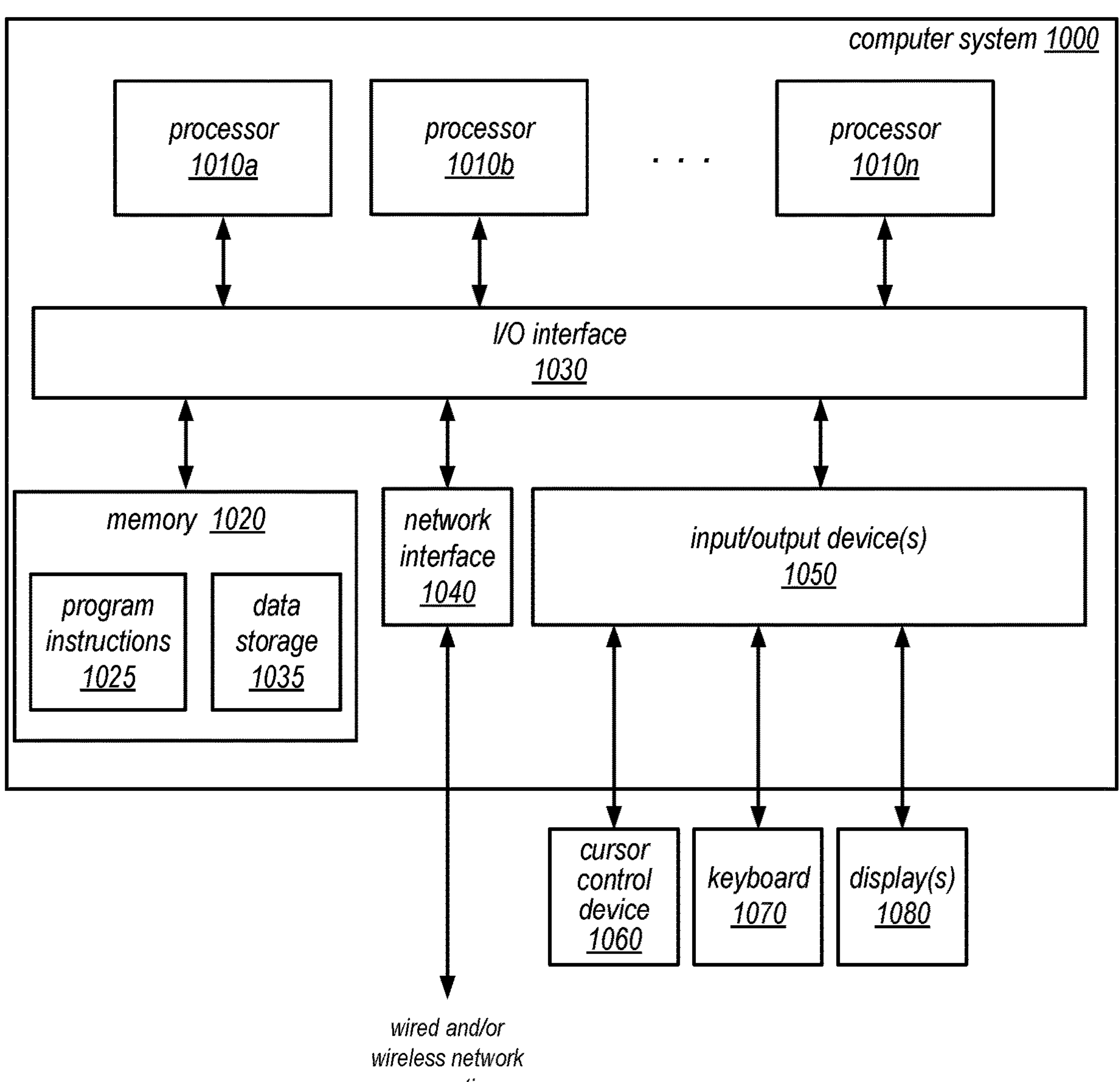
FIG. 8 illustrates an example system to implement the various methods, techniques, and systems described herein, according to some embodiments.

As shown in FIG. 8, memory 1020 may include program instructions 1025, may implement the various methods and techniques as described herein for implementing optimizing selection of materialized views for creation or refresh, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or database services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:

at least one processor; and a memory, storing program instructions that when executed by the at least one processor, cause the at least one processor to implement a database system, configured to:

receive a query that causes one or more data blocks of a plurality of data blocks in a storage system storing a database to be read, wherein the database is in a transition state to a new encryption scheme;

evaluate metadata comprising individual encryption transition state maintained as part of transitioning to the new encryption scheme for the plurality of data blocks to determine that the one or more data blocks have not been encrypted according to the new encryption scheme, wherein the individual encryption transition state indicates respective ones of a plurality of different schemes currently applied to the plurality of data blocks, and wherein the individual encryption state indicates at least one of the plurality of data blocks currently applies the new encryption scheme when the query is received;

perform in-place encryption for the one or more data blocks so that no database data of the one or more data blocks is moved, wherein to perform the in-place encryption, the database system is configured to:

read the one or more data blocks in the storage system to perform the query;

return a response to the query based on the one or more data blocks use data read from the one or more data blocks to perform the query to encrypt the data read from the one or more data blocks with the new encryption scheme;

store, in the one or more data blocks, the data encrypted with the new encryption scheme; and update the individual encryption transition state of the one or more data blocks to indicate that different one of the plurality of schemes, is currently applied.

2. The system of claim 1, wherein the database system is further configured to receive a request that specifies the new encryption scheme to be applied.

3. The system of claim 1, wherein the database system is further configured to:

detect an encryption window;

identify one or more additional data blocks of the plurality of data blocks to encrypt according to the new encryption scheme based on an evaluation of the metadata;

read the one or more additional data blocks of the from the data storage system;

encrypt the one or more additional data blocks according to the new encryption scheme and the encryption window; and store the encrypted one or more additional data blocks in the storage system.

4. The system of claim 1, wherein the database system is a data warehouse service offered by a provider network.

5. A method, comprising:

receiving, at a database system, a request that causes one or more data blocks of a plurality of data blocks in a storage system storing a database to be read, wherein the database is in a transition state to a new encryption scheme;

determining, by the database system, that the one or more data blocks have not been encrypted according to the new encryption scheme based, at least in part, on metadata comprising individual encryption transition state maintained as part of transitioning to the new encryption scheme, wherein the individual encryption transition state indicates respective ones of a plurality of different schemes currently applied to the plurality of data blocks, and wherein the individual encryption state indicates at least one of the plurality of data blocks currently applies the new encryption scheme when the request is received;

performing, by the database system, in-place encryption for the one or more data blocks so that no database data of the one or more data blocks is moved, comprising:

reading, by the database system, the one or more data blocks in the storage system to perform the request;

using, by the database system, data read from the one or more data blocks to encrypt the data read from the one or more data blocks with the new encryption scheme;

storing, by the database system in the one or more data blocks, the data encrypted with the new encryption scheme; and updating the metadata comprising the individual encryption transition state for the one or more data blocks to indicate that the currently applied scheme is the new encryption scheme.

6. The method of claim 5, further comprising receiving a request that specifies the new encryption scheme to be applied.

7. The method of claim 6, wherein the request that specifies the new encryption scheme is a request to resize a processing cluster implementing the database system.

8. The method of claim 6, wherein the request that specifies the new encryption scheme is a request to perform in-place encryption on the database.

9. The method of claim 5, wherein the new encryption scheme is applied to a specified table of one or more tables of the database.

10. The method of claim 5, further comprising:

detecting, by the database system, an encryption window;

identifying, by the database system, one or more additional data blocks of the plurality of data blocks to encrypt according to the new encryption scheme;

reading, by the database system, the one or more additional data blocks of the from the data storage system;

encrypting, by the database system, the one or more additional data blocks according to the new encryption scheme and the encryption window; and storing, by the database system, the encrypted one or more additional data blocks in the storage system.

11. The method of claim 5, further comprising:
receiving, at the database system, a request to add data to the database;
encrypting, by the database system, the data to add to the database in one or more additional data blocks according to the new encryption scheme; and
storing, by the database system, the one or more additional data blocks in the storage system.

12. The method of claim 5, further comprising:
receiving, at the database system, a second request that causes one or more further data blocks of the plurality of data blocks to be read;
determining, by the database system, that the one or more further data blocks have been encrypted according to the new encryption scheme;
reading, by the database system, the one or more further data blocks in the storage system;
decrypting, by the database system, the one or more data blocks with the new encryption scheme; and
performing, by the database system, the second request using the decrypted one or more further data blocks.

13. One or more non-transitory, computer-readable storage media, storing program instructions that when executed on or across one or more computing devices cause the one or more computing devices to implement:
receiving a query that causes one or more data blocks of a plurality of data blocks in a storage system storing a database to be read, wherein the database is in a transition state to a new encryption scheme;
determining that the one or more data blocks have not been encrypted according to the new encryption scheme based, at least in part, on metadata comprising individual encryption transition state maintained as part of transitioning to the new encryption scheme, wherein the individual encryption transition state indicates respective ones of a plurality of different schemes currently applied to the plurality of data blocks, and wherein the individual encryption state indicates at least one of the plurality of data blocks currently applies the new encryption scheme when the query is received;
performing in-place encryption for the one or more data blocks so that no database data of the one or more data blocks is moved, wherein, in performing the in-place encryption, the program instructions cause the one or more computing devices to implement:
reading the one or more data blocks in the storage system to perform the query;
using data read from the one or more data blocks to encrypt the data read from the one or more data blocks with the new encryption scheme;
storing, in the one or more data blocks, the data encrypted with the new encryption scheme; and
updating the metadata comprising the individual encryption transition state for the one or more data blocks to indicate that the currently applied scheme is the new encryption scheme.

14. The one or more non-transitory, computer-readable storage media of claim 13, storing further program instructions that when executed on or across the one or more computing devices, cause the one or more computing devices to further implement receiving a request that specifies the new encryption scheme to be applied as part of a restore operation for the database, wherein the plurality of data blocks are stored as part of a backup copy of the database.

15. The one or more non-transitory, computer-readable storage media of claim 13, storing further program instructions that when executed on or across the one or more computing devices, cause the one or more computing devices to further implement receiving a request that specifies the new encryption scheme to be applied as part of in-place encryption on the database.

16. The one or more non-transitory, computer-readable storage media of claim 13, wherein the new encryption scheme is applied to a specified column of one or more columns of a table of the database.

17. The one or more non-transitory, computer-readable storage media of claim 13, storing further program instructions that when executed on or across the one or more computing devices, cause the one or more computing devices to further implement:
detecting an encryption window;
identifying one or more additional data blocks of the plurality of data blocks to encrypt according to the new encryption scheme;
reading the one or more additional data blocks of the from the data storage system;
encrypting the one or more additional data blocks according to the new encryption scheme and the encryption window; and
storing the encrypted one or more additional data blocks in the storage system.

18. The one or more non-transitory, computer-readable storage media of claim 13, storing further program instructions that when executed on or across the one or more computing devices, cause the one or more computing devices to further implement:
receiving, at the database system, a request to add data to the database;
encrypting, by the database system, the data to add to the database in one or more additional data blocks according to the new encryption scheme; and
storing, by the database system, the one or more additional data blocks in the storage system.

19. The one or more non-transitory, computer-readable storage media of claim 13, wherein the one or more computing devices are implemented as part of a database service offered by a provider network.

* * * * *